United States Patent
Cho et al.

(10) Patent No.: US 10,050,243 B2
(45) Date of Patent: Aug. 14, 2018

(54) RECHARGEABLE BATTERY PACK

(71) Applicant: SAMSUNG SDI CO., LTD., Yongin-si, Gyeonggi-do (KR)

(72) Inventors: Man-Sik Cho, Yongin-si (KR); Kum-Yul Hwang, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 817 days.

(21) Appl. No.: 14/550,891

(22) Filed: Nov. 21, 2014

(65) Prior Publication Data

US 2015/0207117 A1 Jul. 23, 2015

(30) Foreign Application Priority Data

Jan. 20, 2014 (KR) ........................ 10-2014-0006878

(51) Int. Cl.
| | | |
|---|---|---|
| *H01M 2/10* | (2006.01) | |
| *H01M 2/06* | (2006.01) | |
| *H01M 2/08* | (2006.01) | |
| *H01M 2/20* | (2006.01) | |
| *H01M 2/26* | (2006.01) | |
| *H01M 2/30* | (2006.01) | |

(52) U.S. Cl.
CPC ........... *H01M 2/1077* (2013.01); *H01M 2/06* (2013.01); *H01M 2/08* (2013.01); *H01M 2/20* (2013.01); *H01M 2/26* (2013.01); *H01M 2/30* (2013.01); *H01M 2220/20* (2013.01)

(58) Field of Classification Search
CPC ........ H01M 2/1077; H01M 2/30; H01M 2/26; H01M 2/20; H01M 2/06; H01M 2/08; H01M 2220/20
See application file for complete search history.

(56) References Cited

U.S. PATENT DOCUMENTS

| | | | | |
|---|---|---|---|---|
| 2011/0039153 A1* | 2/2011 | Nakayama | ............ | H01M 2/043 429/181 |
| 2013/0224539 A1* | 8/2013 | Hayashi | .............. | H01M 2/1055 429/82 |
| 2013/0330587 A1* | 12/2013 | Takahashi | ........... | H01M 2/1077 429/99 |

FOREIGN PATENT DOCUMENTS

| | | |
|---|---|---|
| EP | 2 204 863 A1 | 7/2010 |
| EP | 2 273 587 A1 | 1/2011 |
| EP | 2 500 964 A2 | 9/2012 |

(Continued)

OTHER PUBLICATIONS

EPO Search Report dated Jun. 1, 2015, for corresponding European Patent application 14195498.2, (6 pages).

(Continued)

*Primary Examiner* — Lisa S Park
(74) *Attorney, Agent, or Firm* — Lewis Roca Rothgerber Christie LLP

(57) ABSTRACT

A rechargeable battery pack including: a cell holder configured to accommodate unit battery cells; a lower case configured to accommodate the cell holder; an upper case attached to an opening of the lower case and covering the cell holder and the unit battery cells; a tab having an end portion drawn out of a through-hole of the upper case to be on an outer surface of the upper case while coupling the unit battery cells; and a terminal electrically coupled to the end portion of the tab while overlapping therewith and attached to the upper case while covering the through-hole.

13 Claims, 17 Drawing Sheets

(56) References Cited

FOREIGN PATENT DOCUMENTS

JP       2011-222409 A   11/2011
KR  10-2013-0043537 A    4/2013

OTHER PUBLICATIONS

EPO Office Action dated May 14, 2018, for corresponding European Patent Application No. 14195498.2 (7 pages).

* cited by examiner

RECHARGEABLE BATTERY PACK

CROSS-REFERENCE TO RELATED APPLICATION

This application claims priority to and the benefit of Korean Patent Application No. 10-2014-0006878, filed in the Korean Intellectual Property Office on Jan. 20, 2014, the entire content of which is incorporated herein by reference.

BACKGROUND

1. Field

Aspects of embodiments of the present invention relate generally to a rechargeable battery pack.

2. Description of the Related Art

A two (2)-wheel vehicle and a four (4)-wheel vehicle are generally provided with a battery pack for starting their engines.

A lead (Pb) storage battery is generally used (or utilized) as the battery pack for starting an engine.

The pack of the lead storage battery is sealed by ultrasonic welding to reduce (e.g., prevent) moisture permeation.

However, a structure formed by the ultrasonic welding makes it difficult to disassemble the pack when repair work on the pack is performed.

The above information disclosed in this Background section is only for enhancement of understanding of the background of the described technology and therefore it may contain information that does not form the prior art that is already known to a person of ordinary skill in the art.

SUMMARY

Aspects of embodiments of the present invention are directed toward a rechargeable battery pack utilized for starting an engine of a two (2)-wheel or four (4)-wheel vehicle.

Aspects of embodiments of the present invention are directed toward a rechargeable battery pack that is capable of allowing easy disassembly for repair work and water resistant (e.g., waterproof) performance during operation.

According to one embodiment of the present invention, there is provided a rechargeable battery pack including: a cell holder configured to accommodate unit battery cells; a lower case configured to accommodate the cell holder; an upper case attached to an opening of the lower case and covering the cell holder and the unit battery cells; a tab having an end portion drawn out of a through-hole of the upper case to be on an outer surface of the upper case while coupling the unit battery cells; and a terminal electrically coupled to the end portion of the tab while overlapping therewith and attached to the upper case while covering the through-hole.

The tab and the terminal may make surface contact with each other outside of the upper case.

The tab and the terminal may be spaced from the through-hole and fastened to the upper case by a fastening member such that the tab and the terminal make surface contact with each other.

The upper case may include a plate-shaped supporting portion configured to support the end portion that is bent from the tab, and the terminal may include a tab connection portion on the end portion to make surface contact with the end portion.

The upper case may include a first supporting protrusion that protrudes to cover the through-hole from above, and the tab connection portion of the terminal may be supported by the first supporting protrusion above the through-hole.

The upper case may include a first insertion groove corresponding to the tab connection portion below the first supporting protrusion.

The first insertion groove and a lateral end of the tab connection portion combined with the first insertion groove may respectively have circular shapes at cross-sections perpendicular to an insertion direction of the tab connection portion.

The upper case may include a coupling groove corresponding to a load connection portion that is coupled to the tab connection portion, and the load connection portion may further include a coupling portion that is bent from the tab connection portion and configured to be coupled to the coupling groove.

The terminal may include a load connection portion that crosses the tab connection portion at one side thereof, and the load connection portion may be bent in a vertical direction, a horizontal direction, and a vertical direction.

The upper case may further include a pressing portion protruding toward the inside of the lower case and may be configured to press the tab and the unit battery cells together.

The upper case may include a first supporting protrusion that protrudes to cover the through-hole from above and a second supporting protrusion that protrudes at an opposite side of that of the first supporting protrusion, and a tab connection portion may be supported by the first and second supporting protrusions.

The upper case may include a first insertion groove that corresponds to the tab connection portion below the first supporting protrusion, and a second insertion groove that corresponds to the tab connection portion below the second supporting protrusion.

The terminal may include a tab connection portion on the end portion to make surface contact therewith, and the tab connection portion may include a moisture discharging groove at an outer part of the through-hole.

As described above, in the example embodiments, the tab to which the unit battery cells are coupled is drawn out of the through-hole to be bent on the outer surface of the upper case, and the terminal is on the tab to be electrically coupled thereto and to be combined with the upper case while covering the through-hole.

That is, in the rechargeable battery pack according to embodiments of the present invention, the terminal may be separable from the tab and the upper case may be separable from the lower case.

Accordingly, example embodiments of the present invention make the disassembly and assembly work easier during repair work, and the terminal covers the through-hole of the upper case, thereby implementing water resistance when the rechargeable battery pack is used.

DETAILED DESCRIPTION

Figure 1:
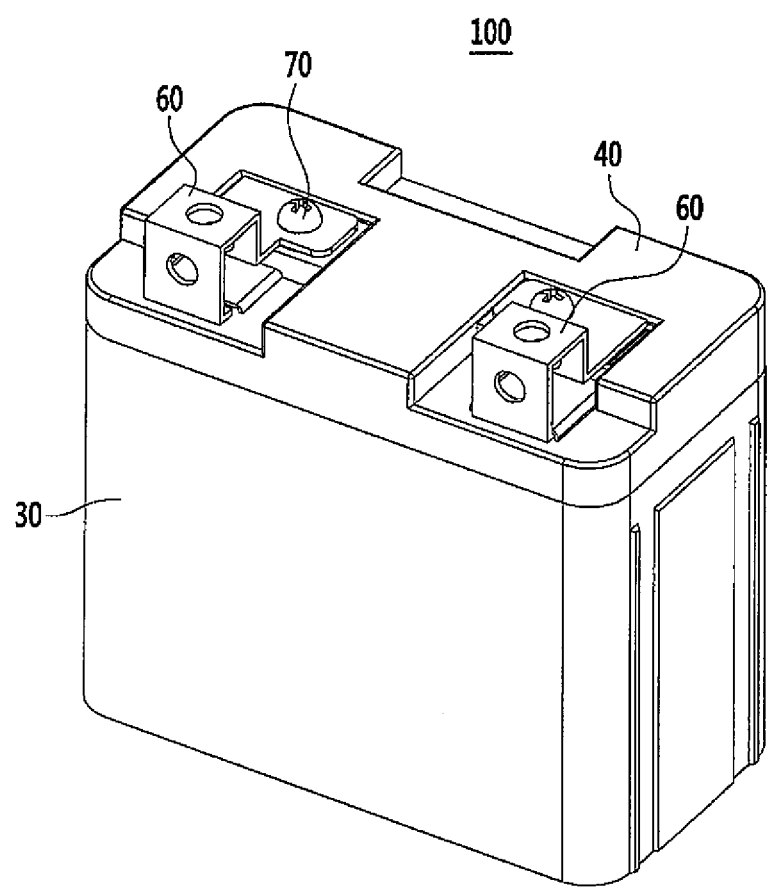
FIG. 1 is a perspective view of a rechargeable battery pack according to a first example embodiment of the present invention.

The present invention will be described more fully hereinafter with reference to the accompanying drawings, in which example embodiments of the present invention are shown.

As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Spatially relative terms, such as "beneath", "below", "lower", "downward", "above", "upper", "horizontal", "vertical", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

When a first element is described as being "coupled" or "connected" to a second element, the first element may be directly "coupled" or "connected" to the second element, or one or more other intervening elements may be located between the first element and the second element.

Figure 2:
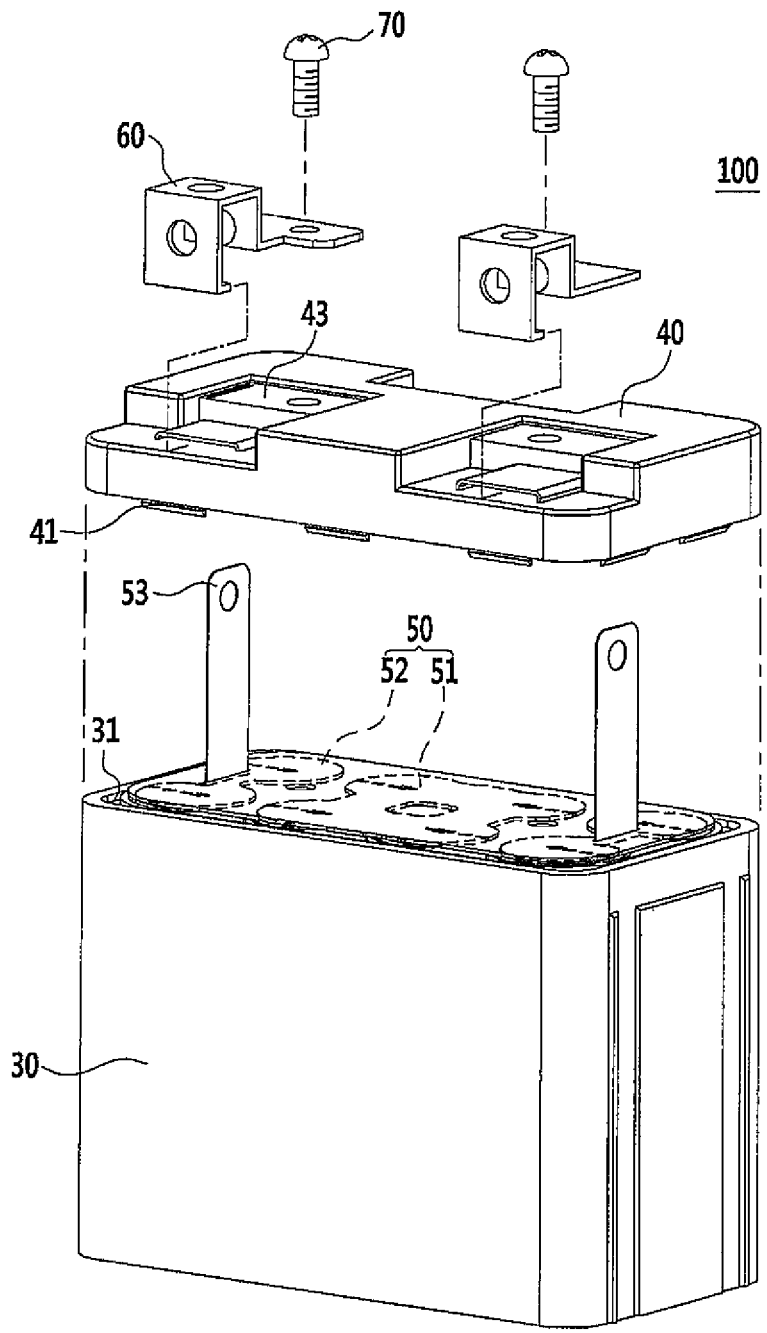
FIG. 2 is an exploded perspective view of the rechargeable battery pack shown in FIG. 1.
Figure 3:
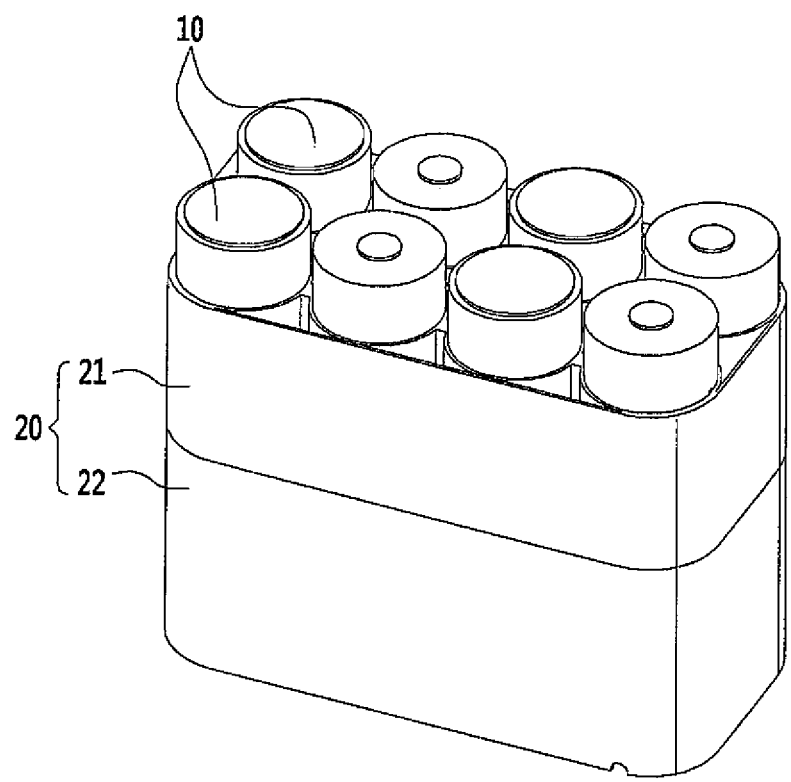
FIG. 3 is a perspective view showing a state in which unit battery cells are assembled in a cell holder.

FIG. 1 is a perspective view of a rechargeable battery pack according to a first example embodiment of the present invention, FIG. 2 is an exploded perspective view of the rechargeable battery pack shown in FIG. 1, and FIG. 3 is a perspective view showing a state in which unit battery cells are assembled in a cell holder.

Referring to FIGS. 1, 2, and 3, a rechargeable battery pack 100 according to a first example embodiment includes: a cell holder 20 for accommodating unit battery cells 10; a lower case 30 for accommodating the cell holder 20; an upper case 40 combined with (e.g., attached to) the lower case 30; a tab 50 coupling the unit battery cells 10; and a terminal 60 coupled to the tab 50.

The unit battery cells 10 used (or utilized) for the first example embodiment include cylindrical rechargeable batteries.

Since disclosed rechargeable batteries that may be used (or utilized) as the unit battery cells 10 should be apparent to those skilled in the art, a detailed description of them will not be provided.

Alternatively, the unit battery cells may include (e.g., may consist of) prism-shaped or pouch-shaped rechargeable batteries.

The cell holder 20 may be handled as a single cell assembly that accommodates a plurality of unit battery cells 10.

For example, the cell holder 20 includes (e.g., consists of) an upper holder 21 and a lower holder 22 that are combined with each other in a length (e.g., a vertical length) direction, and is configured to accommodate eight cylindrical rechargeable batteries, as an example.

The cell holder 20 is provided with receiving holes corresponding to outward shapes (e.g., cylindrical or prismatic shapes) of the unit battery cells 10.

The lower case 30 accommodates the cell holder 20 as the cell assembly in which the unit battery cells 10 is accommodated, and the lower case is combined with the upper case 40, thereby forming an outward shape of the rechargeable battery pack 100.

As an example, the upper case 40 is provided with a hook 41 (or a plurality of hooks), which is combined with a catching groove 31 that is formed in an opening of the lower case 30.

By combining the hook 41 with the catching groove 31, the upper case 40 maintains its combined state with the opening of the lower case 30.

A disassembly and assembly capable structure of the catching groove 31 and the hook 41 makes it easier to disassemble and assemble the rechargeable battery pack 100 when repair work is performed.

Figure 4:
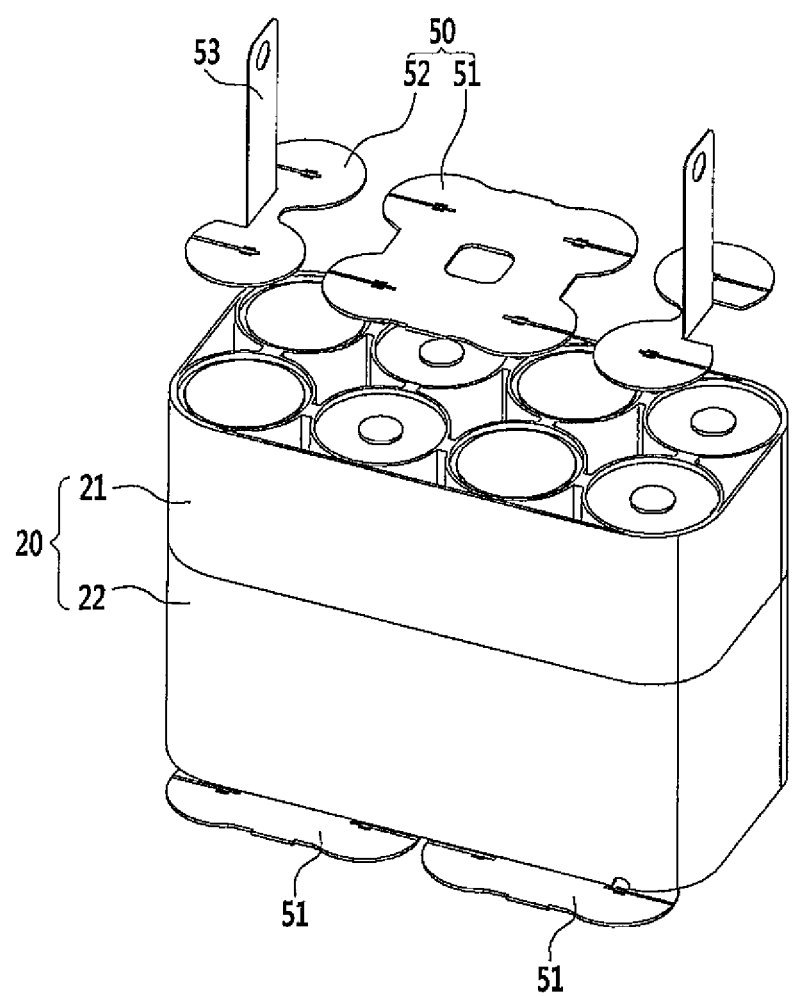
FIG. 4 is a perspective view showing a state in which the unit battery cells are coupled by a tab after the state shown in FIG. 3.
Figure 5:
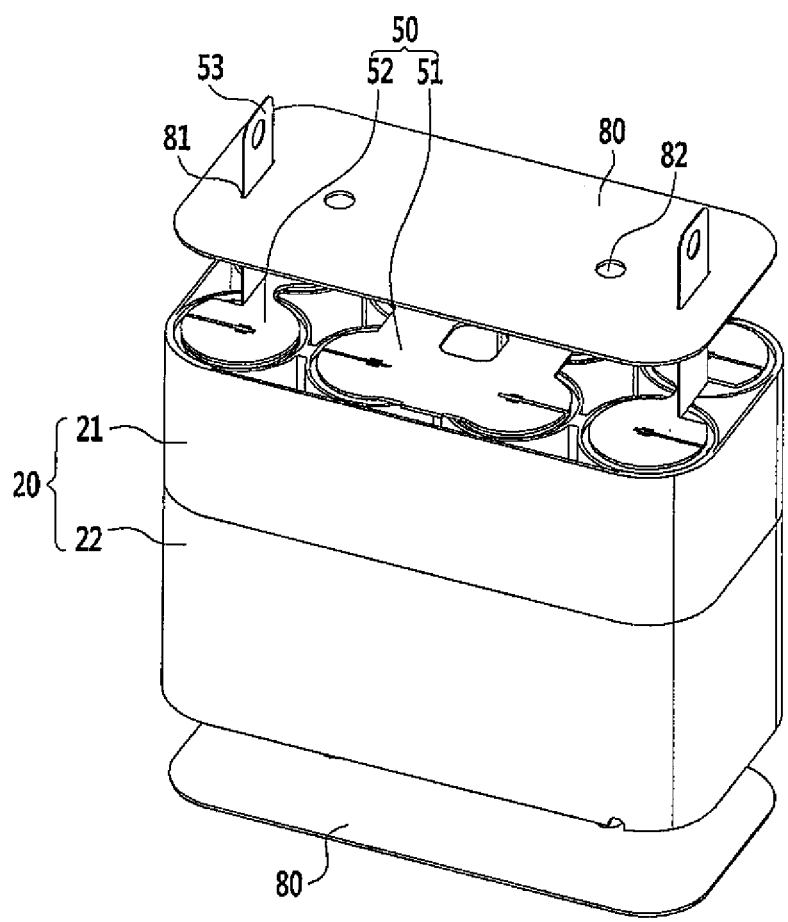
FIG. 5 is a perspective view showing a state in which insulating tapes are attached to the tab after the state shown in FIG. 4.
Figure 6:
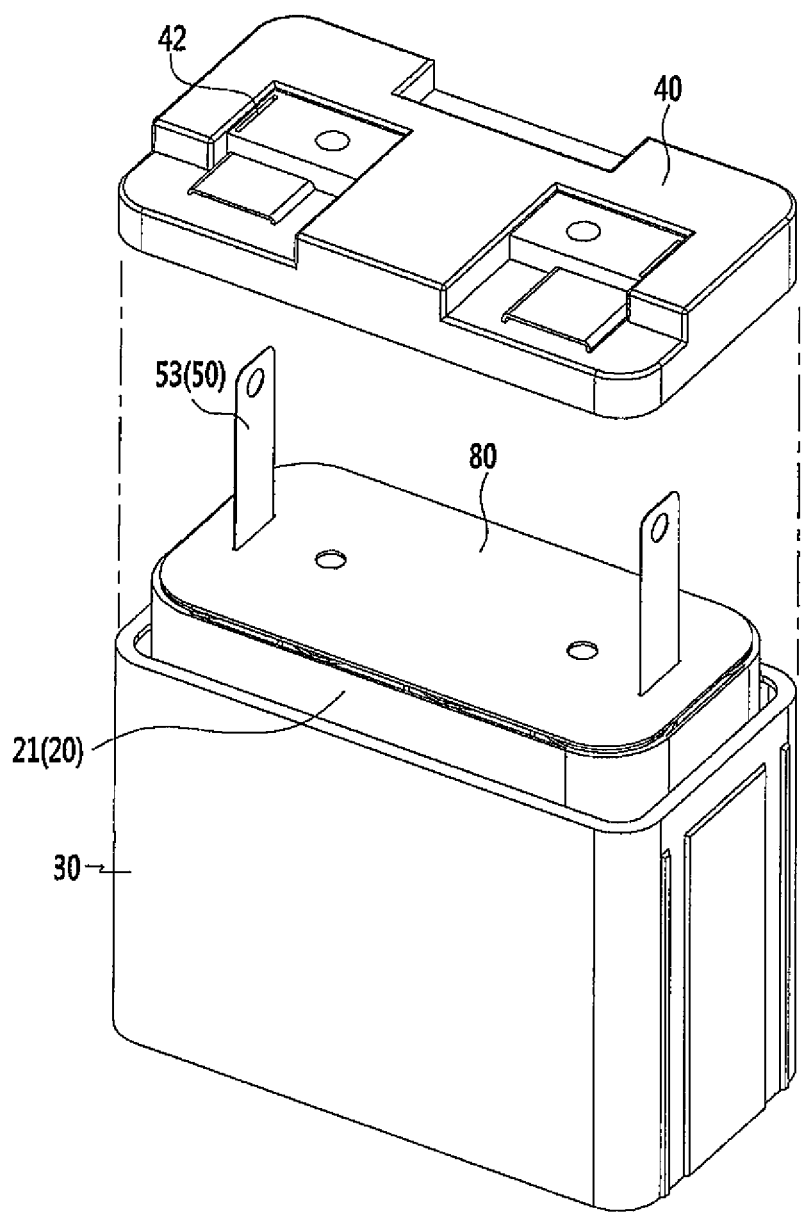
FIG. 6 is a perspective view showing a state in which a cell assembly is inserted into a lower case and then an upper case is assembled.

FIG. 4 is a perspective view showing a state in which the unit battery cells are coupled by the tab after the state shown in FIG. 3, FIG. 5 is a perspective view showing a state in which insulating tapes are attached to the tab after the state shown in FIG. 4, and FIG. 6 is a perspective view showing a state in which the cell assembly is inserted into the lower case and then the upper case is assembled thereto.

Referring to FIGS. 4, 5, and 6, in assembly, the tab 50 electrically couples the unit battery cells 10, and is drawn out of through-holes 42 that are provided in the upper case 40 such that the tab 50 is bent outside of the upper case 40 to be located on an outer surface thereof.

The tab 50 couples the unit battery cells 10 in series or in parallel by welding, and may have various suitable shapes for this purpose.

In FIG. 4, among the unit battery cells 10, the tab 50 is formed to couple eight battery unit cells in series by coupling two unit battery cells in parallel.

In the first example embodiment, the tab 50 is formed with a 4-cell reception tab 51 for coupling four unit battery cells 10 and a 2-cell reception tab 52 for coupling two unit battery cells 10.

That is, at a lower part of FIG. 4, two 4-cell reception tabs 51 respectively couple four battery cell units at lateral sides.

At an upper part of FIG. 4, one 4-cell reception tab 51 couples four intermediate cell units 10, and two 2-cell reception tabs 52 respectively couple two unit battery cells 10 at lateral sides.

The two 2-cell reception tabs 52 electrically couple the two unit battery cells 10, and are drawn out of the through-holes 42 of the upper case 40 such that they are outside of the upper case 40 on the outer surface thereof as a bent end portion 53.

Referring to FIG. 5, insulating tapes 80 are on upper and lower parts of the cell holder 20 such that they are respectively attached to top and bottom surfaces of the tab 50.

The insulating tapes 80 reduce (e.g., prevent) inflow of alien materials to reduce (e.g., prevent) a short-circuit between the unit battery cells 10.

The insulating tape 80 is provided with a first through-hole 81 through which the end portion 53 of the tab 50 penetrates, and a second through-hole 82 through which a fastening member (or fastener) 70, described later, penetrates.

Referring to FIG. 6, the cell holder 20 is inserted into the lower case 30 through an opening of the lower case 30, while accommodating the unit battery cells 10 so that the cell holder 20 and the unit battery cells 10 are accommodated in the lower case 30.

In this case, the unit battery cells 10 are electrically coupled to each other through the tab 50, and the tab 50 remains coated by the insulating tape 80.

Referring to FIGS. 6 and 2, while the unit battery cells 10 are accommodated in the lower case 30, the upper case 40 is combined with (e.g., attached to) the opening of the lower case 30.

In this case, the tab 50 is drawn out of the upper case 40 through the through-hole 42 provided in the upper case 40.

Referring to FIGS. 1 and 2, the drawn-out end portion 53 of the tab 50 is bent outside the upper case 40 to be located on the outer surface thereof.

The terminal 60 is located on the bent end portion 53 of the tab 50 so as to be electrically coupled thereto.

Figure 7:
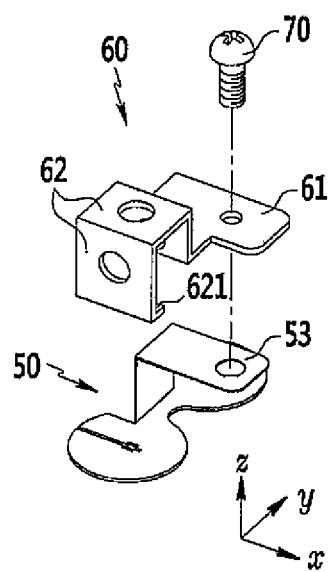
FIG. 7 is an exploded perspective view of the tab and a terminal according to the first example embodiment of the present invention.
Figure 8:
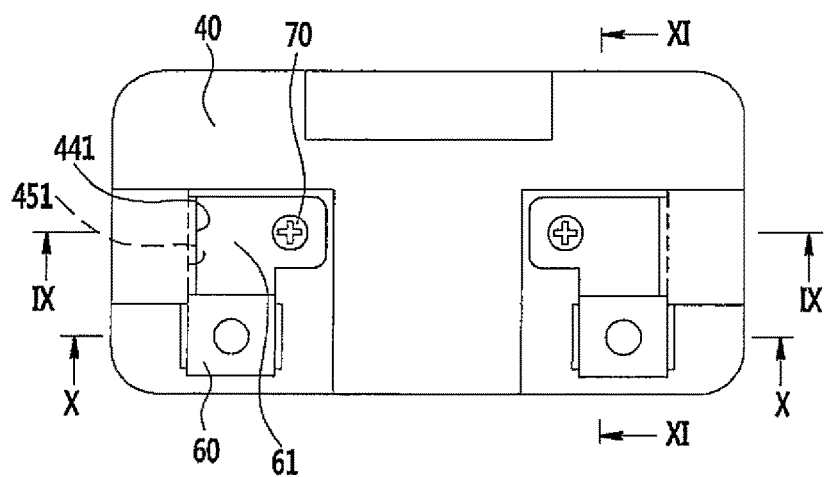
FIG. 8 is a top plan view of the first example embodiment shown in FIG. 1.
Figure 9:
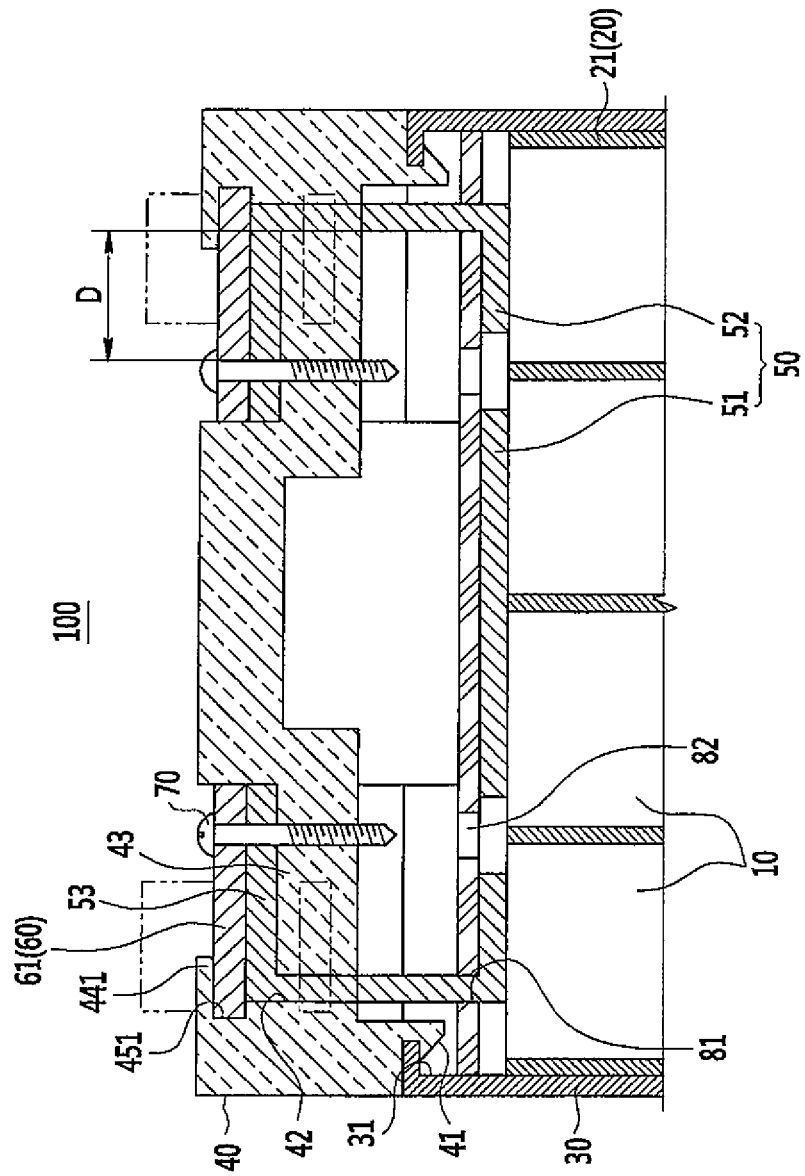
FIG. 9 is a cross-sectional view of FIG. 8 taken along the line IX-IX.

FIG. 7 is an exploded perspective view of the tab and the terminal according to the first example embodiment of the present invention, FIG. 8 is a top plan view of the first example embodiment shown in FIG. 1, and FIG. 9 is a cross-sectional view of FIG. 8 taken along the line IX-IX.

Referring to FIGS. 7, 8, and 9, the terminal 60 is combined with (e.g., attached to) the upper case 40 while covering the through-hole 42.

In this case, the tab 50 may make surface contact with the terminal 60 outside of the upper case 40.

To this end, a plate-shaped supporting portion 43 is provided at the upper case 40 so as to support the bent end portion 53 of the tab 50.

The terminal 60 includes a tab connection portion 61 that is overlapping the end portion 53 of the tab 50 above the supporting portion 43 for surface contact.

Further, the terminal 60 further includes a load connection portion 62 that crosses the tab connection portion 61 at one side thereof to be continuously bent (e.g., sequentially bent) in a vertical direction (z-axis direction), a horizontal direction (y-axis direction), and a vertical direction (z-axis direction) for connection with an external load.

The tab 50 and the terminal 60 are spaced apart from the through-hole 42 by a distance D (e.g., a predetermined distance D) at one side such that they are fastened to the upper case 40 by the fastening member 70.

In this case, the fastening member 70 penetrates through the tab connection portion 61 of the terminal 60 and the end portion 53 of the tab 50 such that the end portion 53 of the tab 50 is fastened to the supporting portion 43 of the upper case 40.

By a fastening force of the fastening member 70, the end portion 53 of the tab 50 and the tab connection portion 61 of the terminal 60 may make surface contact with each other above the supporting portion 43.

That is, the tab 50 and the terminal 60 may be able to form and maintain a structure for stable electrical connection.

Referring to FIG. 9, according to other embodiments of the present invention, when being elongated enough to penetrate through the insulating tape 80, the fastening member 70 may penetrate through the second through-hole 82 and still be electrically separated from the tab 50.

Further, the upper case 40 is provided with a first supporting protrusion 441 that protrudes to cover the through-hole 42 from above, and the terminal 60 is supported by the first supporting protrusion 441 at the tab connection portion 61 at a side of the through-hole 42.

The tab connection portion 61 of the terminal 60 is supported by the first supporting protrusion 441 by covering the through-hole 42, and makes surface contact with the end portion 53 of the tab 50 for electrical connection, thereby being fixed to the fastening member 70.

That is, in the upper case 40 exposed outside, a part to which the terminal 60 is fixed and the through-hole 42 through which the tab 50 is drawn out are separated from each other, and the through-hole 42 is covered by the first supporting protrusion 441.

Accordingly, when the rechargeable battery pack 100 is used (or utilized), moisture permeation through the through-hole 42, through which the tab 50 is drawn out, can be reduced (e.g., prevented).

That is, the rechargeable battery pack 100 with water resistance is implemented.

The tab connection portion 61 of the terminal 60 is inserted (e.g., inserted by sliding) on the supporting portion 43 such that its one end is supported by the first supporting protrusion 441.

Then, the other end of the tab connection portion 61 is coupled to the end portion 53 of the tab 50 by the fastening member 70 so as to be fixed to the supporting portion 43.

Thus, the tab connection portion 61 may be able to make stable surface contact with the end portion 53 above the supporting portion 43.

Further, the upper case 40 is formed with a first insertion groove 451 corresponding to the tab connection portion 61 below the first supporting protrusion 441.

The first insertion groove 451 causes the tab connection portion 61 to be inserted (e.g., inserted by sliding) in the first supporting protrusion 441 such that the tab connection portion 61 is more firmly supported by the first supporting protrusion 441, and may be able to further maintain the insertion state.

As such, a structure in which the tab connection portion 61 is combined (e.g. combined by sliding) with the first supporting protrusion 441 and the first insertion groove 451 and in which the tab connection portion 61 is combined with the end portion 53 of the tab 50 by the fastening member 70 makes disassembly and assembly of the rechargeable battery pack 100 easier when doing repairs.

Figure 10:
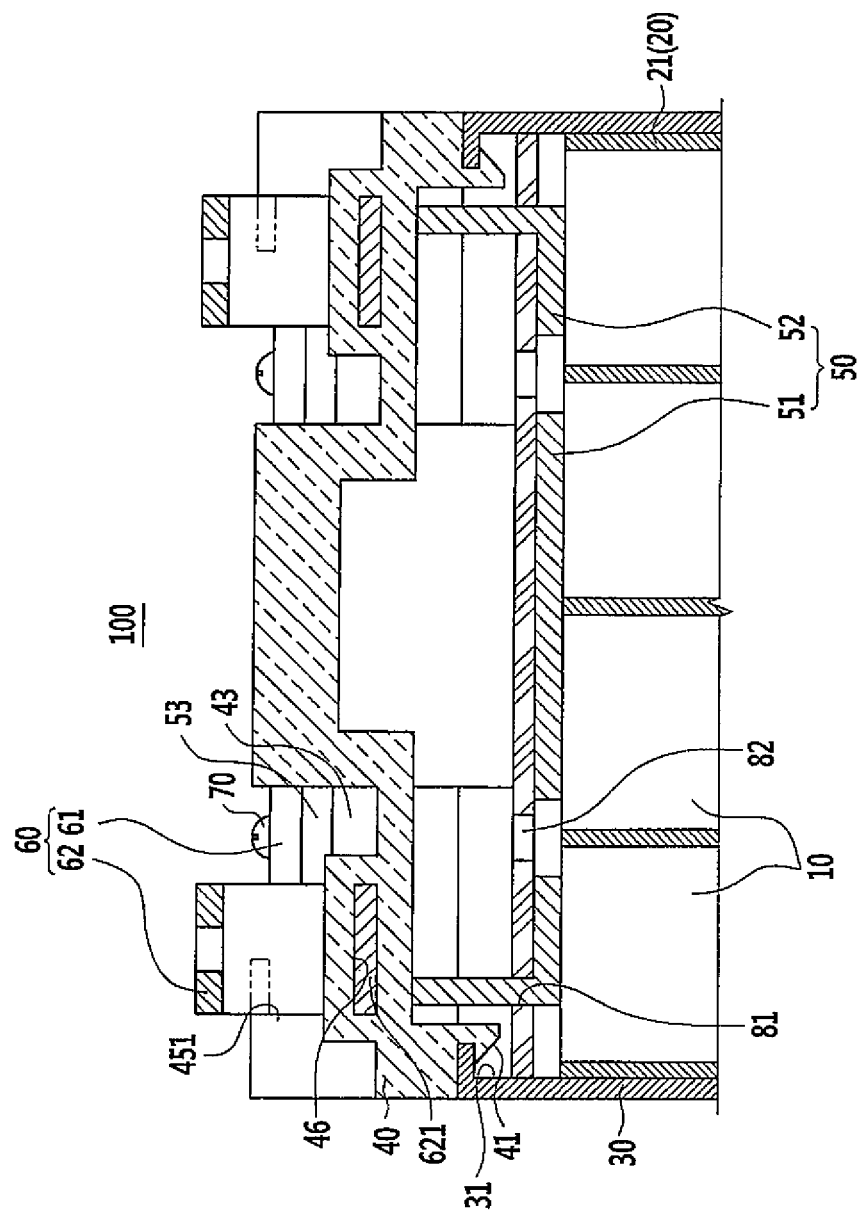
FIG. 10 is a cross-sectional view of FIG. 8 taken along the line X-X.
Figure 11:
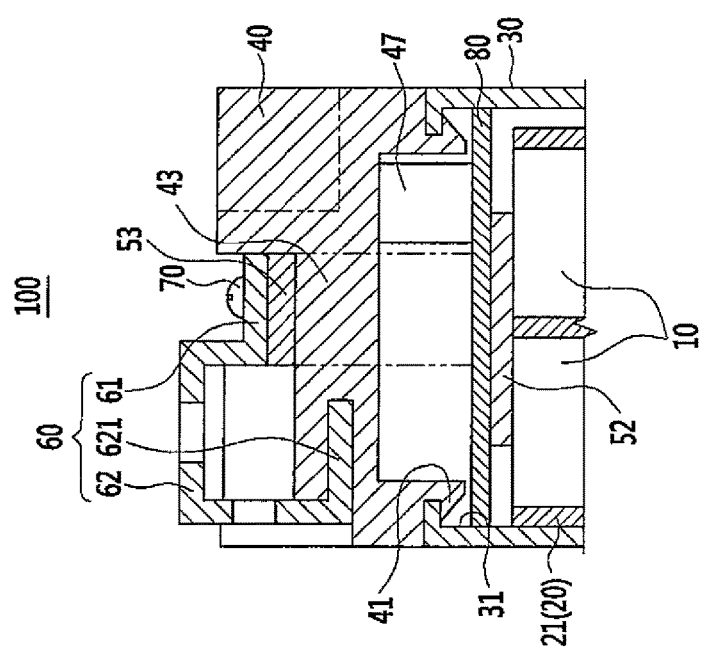
FIG. 11 is a cross-sectional view of FIG. 8 taken along the line XI-XI.

FIG. 10 is a cross-sectional view of FIG. 8 taken along the line X-X, and FIG. 11 is a cross-sectional view of FIG. 8 taken along the line XI-XI.

Referring to FIGS. 7, 8, 10, and 11, the upper case 40 is formed with a coupling groove 46 corresponding to the load connection portion 62.

For its corresponding portion, the load connection portion 62 further includes a coupling portion 621 that is bent in a horizontal direction of the tab connection portion 61 to be combined with the coupling groove 46.

When the tab connection portion 61 is combined (e.g., combined by sliding) with the first supporting protrusion 441 and the first insertion groove 451, the coupling portion 621 of the load connection portion 62 is combined (e.g., combined by sliding) with the coupling groove 46 of the upper case 40.

Accordingly, the load connection portion 62 is firmly combined with the upper case 40 in the terminal 60, and may be able to maintain a stable electrical connection when a load is coupled.

A coupled structure (e.g., a structure coupled by sliding) between the coupling portion 621 of the terminal 60 and the coupling groove 46 not only makes the disassembly and assembly of the rechargeable battery pack 100 easier when doing repairs, but also makes the surface contact between the tab connection portion 61 of the terminal 60 and the end portion 53 of the tab 50 more stable.

The upper case 40 is further provided with a pressing portion 47 at its inner lower part.

The pressing portion 47 protrudes toward inside of the lower case 30 to press the tab 50 and the unit battery cells 10 accommodated in the lower case 30 while being coupled therewith.

For example, the pressing portion 47 presses the insulating tape 80 provided on a top surface of the tab 50 to reduce (e.g., prevent) movement of the unit battery cells 10 inside the lower and upper cases 30 and 40 while maintaining an electrical connection between the tab 50 and the unit battery cells 10.

Various example embodiments will now be described.

A description of the same constituent elements as the first example embodiment and the aforementioned example embodiments will not be provided again.

Figure 12:
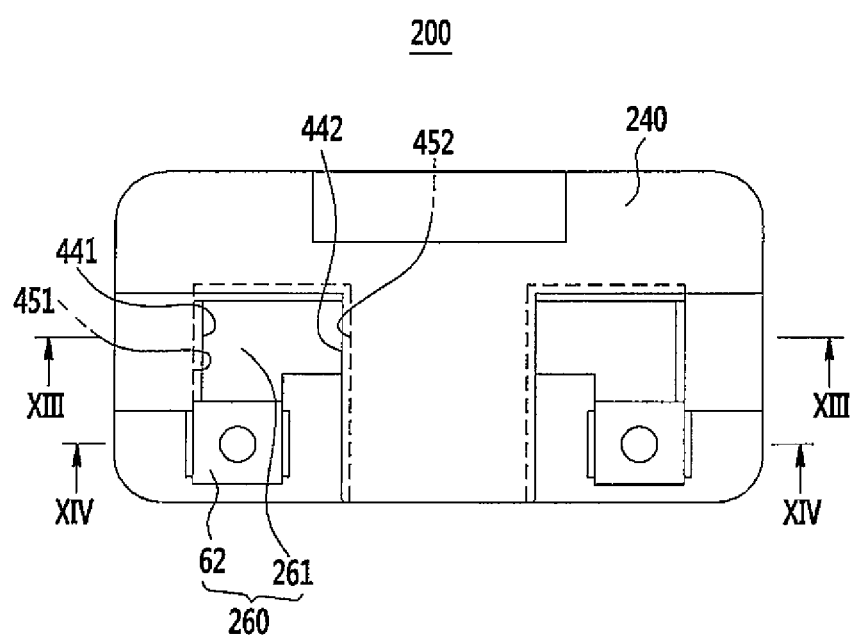
FIG. 12 is a top plan view of a rechargeable battery pack according to a second example embodiment of the present invention.
Figure 13:
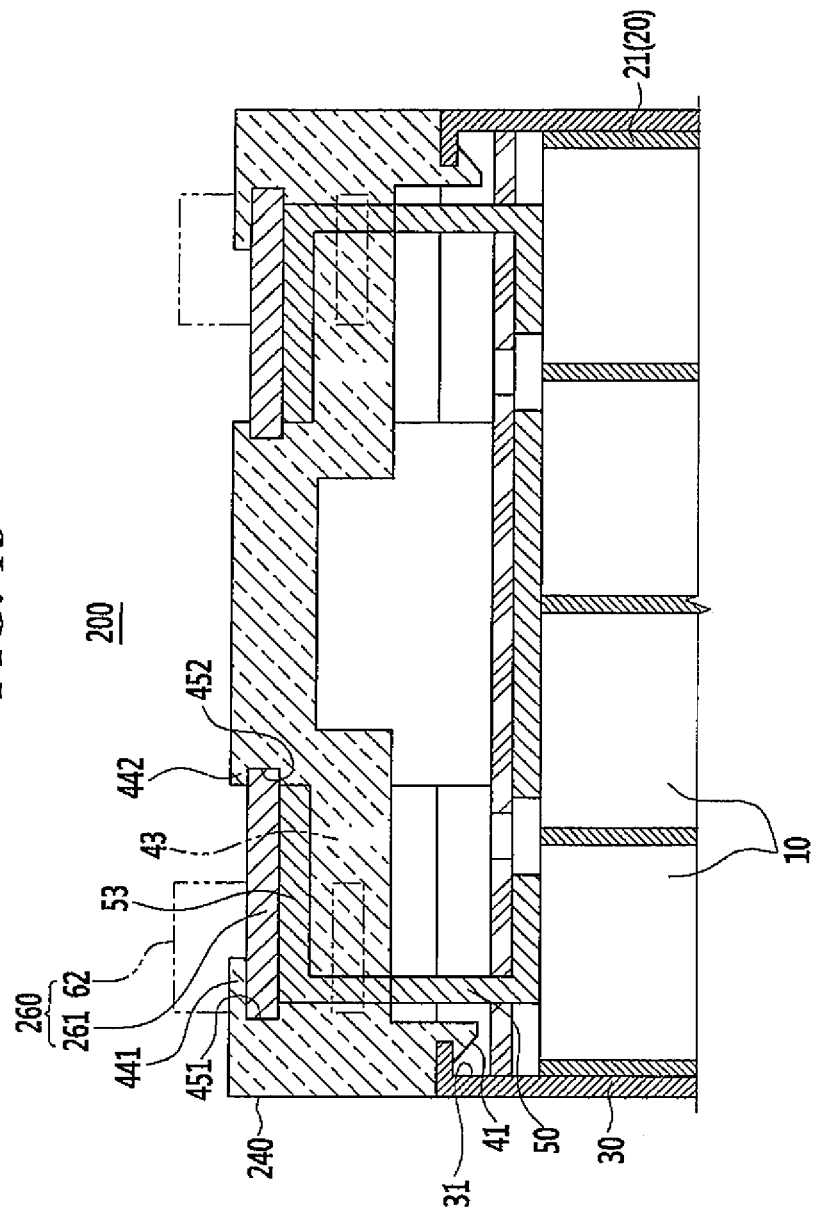
FIG. 13 is a cross-sectional view of FIG. 12 taken along the line XIII-XIII.
Figure 14:
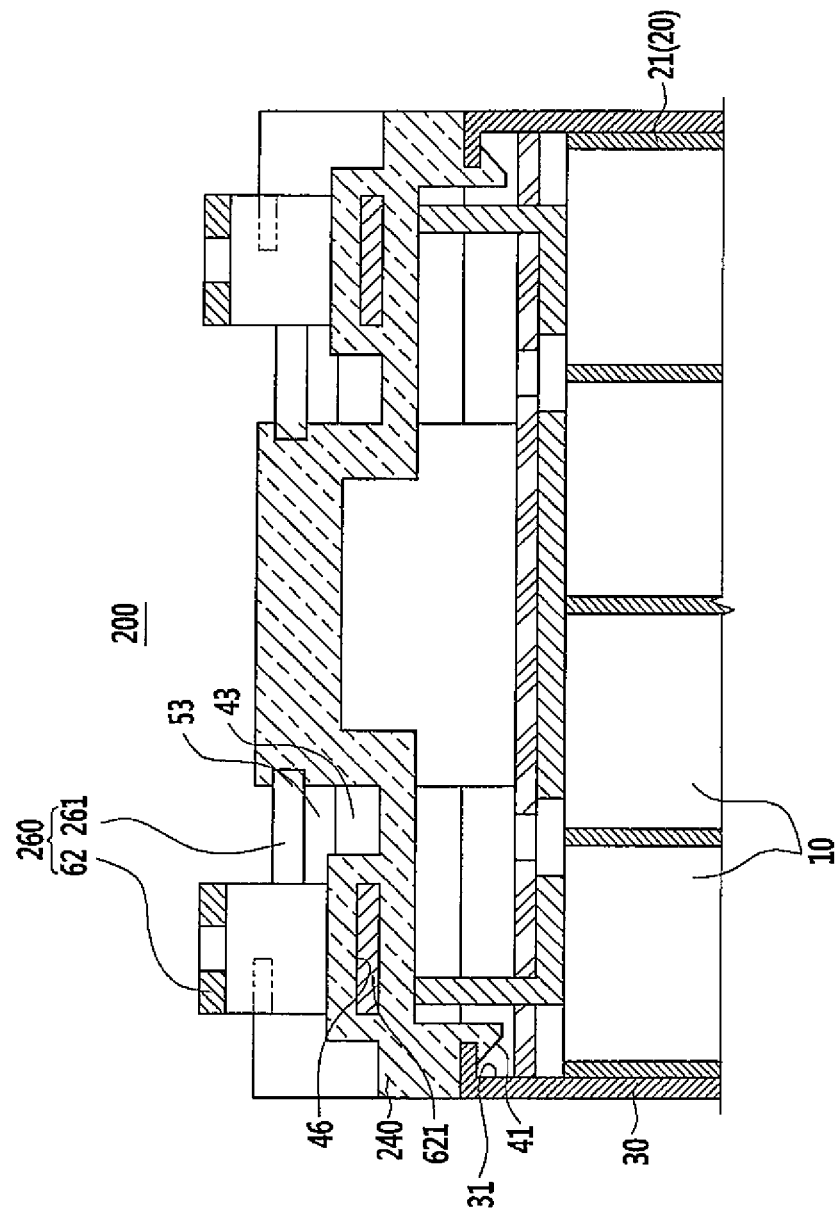
FIG. 14 is a cross-sectional view of FIG. 12 taken along the line XIV-XIV.

FIG. 12 is a top plan view of the rechargeable battery pack according to a second example embodiment of the present invention, FIG. 13 is a cross-sectional view of FIG. 12 taken along the line XIII-XIII, and FIG. 14 is a cross-sectional view of FIG. 12 taken along the line XIV-XIV.

Referring to FIGS. 12, 13, and 14, in a rechargeable battery pack 200 according to the second example embodiment of the present invention, an upper case 240 is provided with a first supporting protrusion 441 that protrudes to cover the through-hole 42 at one side, and a second supporting protrusion 442 that protrudes at the other side to face the first supporting protrusion 441.

A terminal 260 is supported by the first and second supporting protrusions 441 and 442 with a tab connection portion 261.

Thus, the tab connection portion 261 may be able to maintain stable surface contact with the end portion 53 on the supporting portion 43.

The upper case 240 is provided with a first insertion groove 451 corresponding to the tab connection portion 261 below the first supporting protrusion 441, and a second insertion groove 452 corresponding to the tab connection portion 261 below the second supporting protrusion 442.

The first and second insertion grooves 451 and 452 cause the tab connection portion 261 to be inserted (e.g., inserted by sliding) in the first and second supporting protrusions 441 and 442 such that the tab connection portion 261 is more firmly supported by the first and second supporting protrusions 441 and 442, and may be able to further maintain the insertion state.

As such, when the tab connection portion 261 is combined (e.g., combined by sliding) with both the first and second supporting protrusions 441 and 442 and the first and second insertion grooves 451 and 452, the coupling portion 621 of the load connection portion 62 is combined (e.g., combined by sliding) with a coupling groove 46 of the upper case 240.

Accordingly, the load connection portion 62 is firmly combined with the upper case 240 in the terminal 260, and may be able to maintain a stable electrical connection when a load is coupled.

Figure 15:
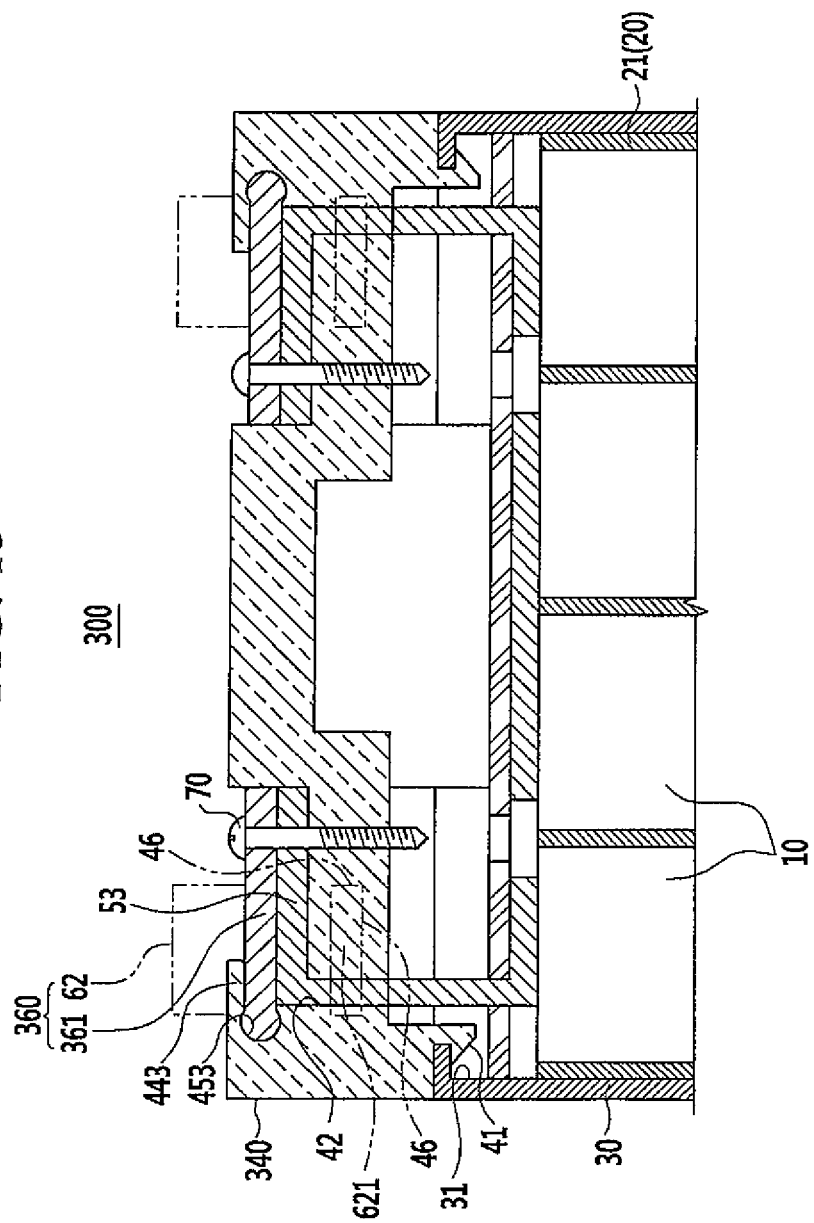
FIG. 15 is a cross-sectional view of a rechargeable battery pack according to a third example embodiment of the present invention.

FIG. 15 is a cross-sectional view of a rechargeable battery pack according to a third example embodiment of the present invention.

Referring to FIG. 15, in a rechargeable battery pack 300 according to the third example embodiment of the present invention, a first insertion groove 453 and a lateral part of a tab connection portion 361 combined with the first insertion groove 453 respectively have circular shapes in cross-sections perpendicular to an insertion direction of the tab connection portion 361.

The first insertion groove 453 causes the tab connection portion 361 to be inserted (e.g., inserted by sliding) in the first supporting protrusion 443 such that the tab connection portion 361 is more firmly supported by the first supporting protrusion 443, and may be able to further maintain the insertion state.

When the tab connection portion 361 of a terminal 360 is combined with both the first supporting protrusion 443 and the first insertion groove 453, the coupling portion 621 of the load connection portion 62 is combined (e.g., combined by sliding) with a coupling groove 46 of an upper case 340.

Accordingly, the load connection portion 62 is firmly combined with the upper case 340 in the terminal 360, and may be able to maintain a stable electrical connection when a load is coupled.

Figure 16:
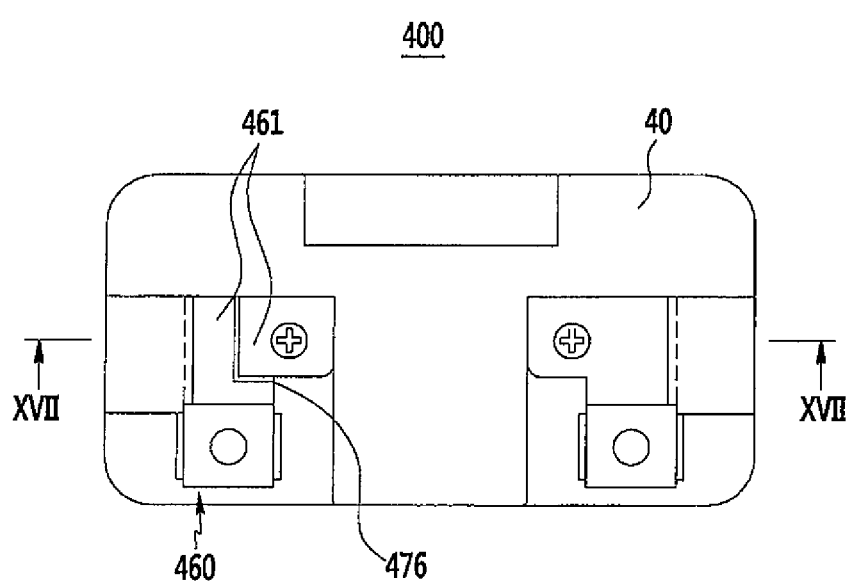
FIG. 16 is a top plan view of a rechargeable battery pack according to a fourth example embodiment of the present invention.
Figure 17:
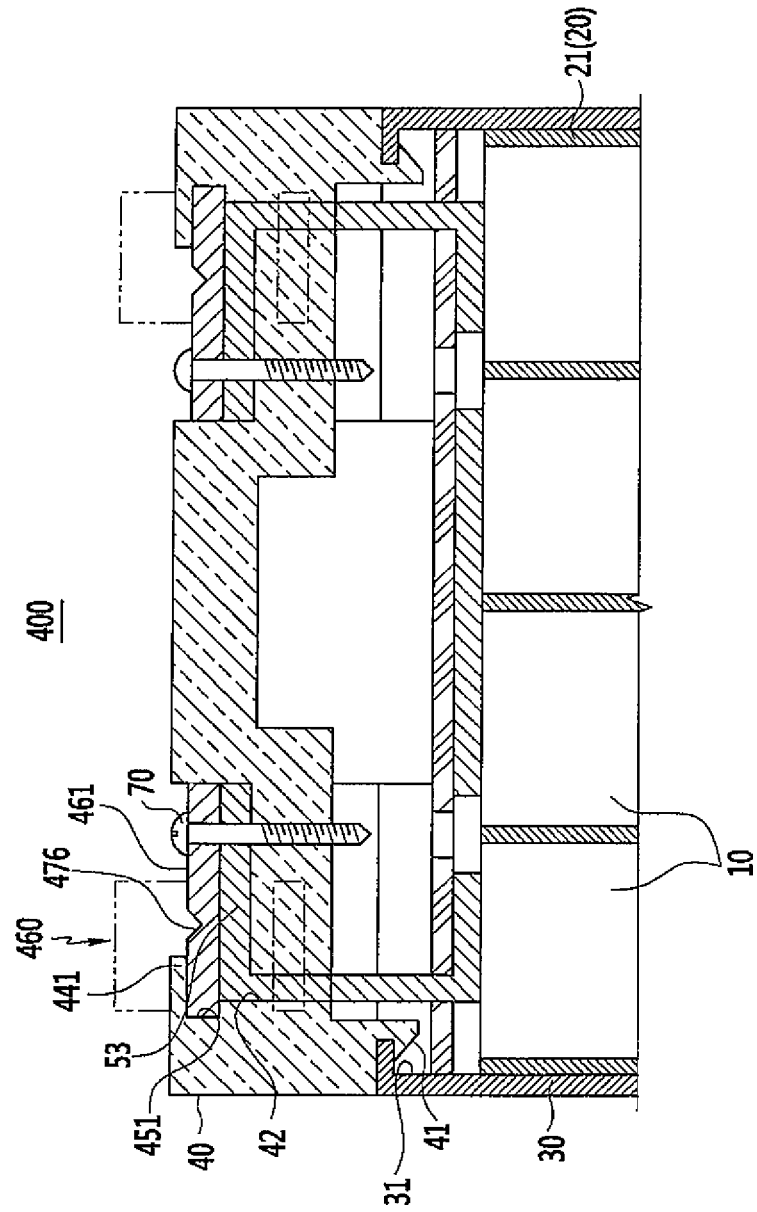
FIG. 17 is a cross-sectional view of FIG. 16 taken along the line XVII-XVII.

FIG. 16 is a top plan view of a rechargeable battery pack according to a fourth example embodiment of the present invention, and FIG. 17 is a cross-sectional view of FIG. 16 taken along the line XVII-XVII.

Referring to FIGS. 16 and 17, in the rechargeable battery pack 400 according to a fourth example embodiment, a terminal 460 of a tab connection portion 461 is provided with a dew discharging groove 476 at an outer part of the through-hole 42.

The dew discharging groove 476 is formed outside the upper case 40 and at an outer side of the terminal 460 to direct dew and other moisture collected in the terminal 460 in a direction away from the through-hole 42, thereby reducing a chance of (e.g., preventing) a short-circuit between the unit battery cells 10 due to the dew.

While this invention has been described in connection with what is presently considered to be practical example embodiments, it is to be understood that the present invention is not limited to the disclosed embodiments, but, on the contrary, is intended to cover various modifications and equivalent arrangements included within the spirit and scope of the appended claims, and equivalents thereof.

DESCRIPTION OF SYMBOLS

10: unit battery cell
20: cell holder
21: upper holder
22: lower holder
30: lower case
31: catching groove
40, 240, 340: upper case
41: hook
42: through-holes
43: supporting portion
46: coupling groove
47: pressing portion
50: tab
51: 4-cell reception tab
52: 2-cell reception tab
53: end portion
60, 260, 360, 460: terminal
61, 261, 361, 461: tab connection portion
62: load connection portion
70: fastening member
80: insulating tape
81, 82: first, second through-holes
100, 200, 300, 400: rechargeable battery pack
441, 443: first supporting protrusion
442: second supporting protrusion
451, 453: first insertion groove
452: second insertion groove
476: dew discharging groove
621: coupling portion
D: distance

What is claimed is:

1. A rechargeable battery pack comprising:
a cell holder configured to accommodate unit battery cells;
a lower case configured to accommodate the cell holder;
an upper case separably attached to an opening of the lower case and covering the cell holder and the unit battery cells in a first direction;
a tab having an end portion drawn out of a through-hole of the upper case in the first direction and bent in a second direction to be removably positioned on an outer surface of the upper case while coupling the unit battery cells; and
a terminal electrically coupled to the end portion of the tab while overlapping therewith and attached to the upper case while overlapping and covering the through-hole in the first direction.

2. The battery pack of claim 1, wherein the tab and the terminal make surface contact with each other outside of the upper case.

3. The battery pack of claim 1, wherein the tab and the terminal are spaced from the through-hole and are fastened to the upper case by a fastening member such that the tab and the terminal make surface contact with each other.

4. The battery pack of claim 1, wherein the upper case comprises a plate-shaped supporting portion configured to support the end portion of the tab, and the terminal comprises a tab connection portion overlapping the end portion to make surface contact with the end portion.

5. The battery pack of claim 4, wherein the upper case comprises a first supporting protrusion that protrudes to cover the through-hole from above, and the tab connection portion of the terminal is supported by the first supporting protrusion above the through-hole.

6. The battery pack of claim 5, wherein the upper case comprises a first insertion groove corresponding to the tab connection portion below the first supporting protrusion.

7. The battery pack of claim 6, wherein the first insertion groove and a lateral end of the tab connection portion combined with the first insertion groove respectively have circular shapes at cross-sections perpendicular to an insertion direction of the tab connection portion.

8. The battery pack of claim 6, wherein the upper case comprises a coupling groove corresponding to a load connection portion that is coupled to the tab connection portion, and the load connection portion further comprises a coupling portion that is bent from the tab connection portion and configured to be coupled to the coupling groove.

9. The battery pack of claim 5, wherein the terminal comprises a load connection portion that crosses the tab connection portion at one side thereof, and the load connection portion is bent to define a first portion extending in a vertical direction, a second portion extending in a horizontal direction, and a third portion extending in the vertical direction.

10. The battery pack of claim 1, wherein the upper case further comprises a pressing portion protruding toward the inside of the lower case and configured to press the tab and the unit battery cells together.

11. The battery pack of claim 1, wherein the upper case comprises a first supporting protrusion that protrudes to cover the through-hole from above and a second supporting protrusion that protrudes at an opposite side of that of the first supporting protrusion, and a tab connection portion of the terminal is supported by the first and second supporting protrusions.

12. The battery pack of claim 11, wherein the upper case comprises a first insertion groove that corresponds to a first portion of the tab connection portion that is below the first supporting protrusion, and a second insertion groove that corresponds to a second portion of the tab connection portion that is below the second supporting protrusion.

13. The battery pack of claim 1, wherein the terminal comprises a tab connection portion overlapping the end portion to make surface contact therewith, and the tab connection portion comprises a moisture discharging groove at an outer part of the through-hole.

* * * * *